United States Patent
Henrottin et al.

(10) Patent No.: US 11,292,084 B2
(45) Date of Patent: Apr. 5, 2022

(54) METHOD FOR JOINING A SUBSTRATE AND A PART WITH STRUCTURING OF THE SUBSTRATE

(71) Applicant: LASER ENGINEERING APPLICATIONS, Seraing (BE)

(72) Inventors: Anne Henrottin, Lierneux (BE); Jose Antonio Ramos de Campos, Angleur (BE); Axel Kupisiewicz, Neupré (BE); Gabriel Morales Cid, Cordova (ES); Rafael González Higueras, Martos (ES); Francisco Javier Navas Martos, Torredonjimeno (ES)

(73) Assignee: LASER ENGINEERING APPLICATIONS S.A., Seraing (BE)

( * ) Notice: Subject to any disclaimer, the term of this patent is extended or adjusted under 35 U.S.C. 154(b) by 557 days.

(21) Appl. No.: 16/097,778

(22) PCT Filed: Apr. 26, 2017

(86) PCT No.: PCT/EP2017/059957
§ 371 (c)(1),
(2) Date: Oct. 30, 2018

(87) PCT Pub. No.: WO2017/191013
PCT Pub. Date: Nov. 9, 2017

(65) Prior Publication Data
US 2019/0168340 A1 Jun. 6, 2019

(30) Foreign Application Priority Data
May 2, 2016 (BE) .................................... 2016/5314

(51) Int. Cl.
*B23K 26/062* (2014.01)
*B23K 26/08* (2014.01)
(Continued)

(52) U.S. Cl.
CPC .......... *B23K 26/21* (2015.10); *B23K 26/0624* (2015.10); *B23K 26/082* (2015.10);
(Continued)

(58) Field of Classification Search
CPC ........... B23K 26/062–0624; B23K 26/08–082; B23K 26/32–324; B23K 26/352–354
See application file for complete search history.

(56) References Cited

U.S. PATENT DOCUMENTS

2005/0139582 A1* 6/2005 Tanaka .............. H01L 21/02672
219/121.75
2005/0263498 A1* 12/2005 Hiramatsu ........... B23K 26/082
219/121.7
(Continued)

FOREIGN PATENT DOCUMENTS

| CN | 103057117 A | 4/2013 |
|----|---|---|
| JP | 2016-44337 A | 4/2016 |

OTHER PUBLICATIONS

Written Opinion of the International Searching Authority dated Jun. 13, 2017, issued in corresponding International Application No. PCT /EP2017/059957, filed Apr. 26, 2017, 9 pages.
(Continued)

*Primary Examiner* — Michael A Laflame, Jr.
(74) *Attorney, Agent, or Firm* — Christensen O'Connor Johnson Kindness PLLC (57) ABSTRACT

A method of assembling a substrate with a part is provided. The method includes a step of structuring the substrate by a pulsed laser. In one example, the substrate is metallic and the part is polymer-based. The structuring step engraves grooves into the substrate in a pattern determined by the relative motion of the beam and the substrate. The pattern is configured to provide improved adhesion between the structured substrate and a part after assembling the substrate and the part by laser welding. The method of assembling may
(Continued)

further include a pre-treatment step of the structured surface to allow improve laser absorption during the welding assembling.

17 Claims, 7 Drawing Sheets

(51) Int. Cl.
| | |
|---|---|
| B23K 26/32 | (2014.01) |
| B23K 26/21 | (2014.01) |
| B23K 26/324 | (2014.01) |
| B23K 26/323 | (2014.01) |
| B23K 26/082 | (2014.01) |
| B23K 26/0622 | (2014.01) |
| B23K 26/60 | (2014.01) |
| B23K 26/352 | (2014.01) |
| B23K 26/364 | (2014.01) |
| B23K 37/02 | (2006.01) |
| B23K 26/359 | (2014.01) |
| B23K 26/361 | (2014.01) |
| B23K 103/18 | (2006.01) |

(52) U.S. Cl.
CPC ...... *B23K 26/0853* (2013.01); *B23K 26/0876* (2013.01); *B23K 26/323* (2015.10); *B23K 26/324* (2013.01); *B23K 26/352* (2015.10); *B23K 26/355* (2018.08); *B23K 26/359* (2015.10); *B23K 26/3584* (2018.08); *B23K 26/361* (2015.10); *B23K 26/364* (2015.10); *B23K 26/60* (2015.10); *B23K 37/0235* (2013.01); *B23K 2103/18* (2018.08)

(56) References Cited

U.S. PATENT DOCUMENTS

| | | | |
|---|---|---|---|
| 2014/0065359 A1* | 3/2014 | Udapi Roa Kulkarni | .................. B23K 26/0661 428/141 |
| 2014/0158674 A1* | 6/2014 | Moffatt | .............. B23K 26/0622 219/385 |
| 2014/0202997 A1* | 7/2014 | Vadali | ................ B23K 26/3576 219/121.66 |
| 2015/0136226 A1 | 5/2015 | Guo et al. | |
| 2020/0262173 A1* | 8/2020 | Jung | .................. B29C 66/0246 |

OTHER PUBLICATIONS

Amend, P., et al., "Thermal Joining of Thermoplastic Metal Hybrids by Means of Mono- and Polychromatic Radiation," Physics Procedia 41:98-105, Apr. 2013.

International Search Report dated Jun. 13, 2017, issued in corresponding International Application No. PCT/EP2017/059957, filed Apr. 26, 2017, 7 pages.

Roesner, A., et al., "Laser Assisted Joining of Plastic Metal Hybrids," Physics Procedia 12:370-377, Dec. 2011.

Yong, J., et al., "Femtosecond Laser Controlled Wettability of Solid Surfaces," Soft Matter 11(46):8897-8906, Sep. 2015.

* cited by examiner

METHOD FOR JOINING A SUBSTRATE AND A PART WITH STRUCTURING OF THE SUBSTRATE

TECHNICAL FIELD

According to a first aspect, the present invention concerns a method of assembling a substrate with a part comprising the structuring of the substrate. According to a second aspect, the invention concerns an assembly of a structured substrate and a part, which can be obtained by said method of assembling. According to a third aspect, the invention concerns a device for assembling a substrate and a part.

BACKGROUND

It is known to the person skilled in the art to perform an assembly by joining a first and a second materials by solidifying the second material upon contact with the first material. The surface appearance and in particular the microstructure of the surface of the first material is essential for the mechanical properties of the joint of the assembly.

An approach to increase the second material adhesion to the first material is to modify the first material surface in contact with the second material. The document Amend P. et al., Physics Procedia 41, pp 98-105 (2013) presents a method of assembling comprising the structuring of an aluminium substrate surface to allow a better adhesion with a polymer material. This method also provides irradiation heating means that generate a light comprising monochromatic and polychromatic components allowing the assembling of the polymer material on the structured surface of the metal substrate.

One of the disadvantages of this method is the use of a light from two monochromatic and polychromatic light sources. Another disadvantage, although this method has assemblies with good mechanical properties and in particular high tensile strength values, is that the assembly failure occurs at the interface between the metal substrate and the plastic material and not in the plastic material.

SUMMARY OF THE INVENTION

One of the aims of the invention is to provide a method of assembling that allows a better adhesion between a substrate and a part. One of the aims of the invention is to provide a method of assembling a substrate and a part by exposing them to a single light source during a welding step. One of the aims of the invention is to provide a method of assembling a substrate and a part that, during a tensile failure test, has a cohesive failure and not an interfacial failure.

To this end, the invention proposes, according to a first aspect, a method of assembling a substrate with a part, said substrate having an upper surface and a lower surface, and a part having a surface, said method comprising the steps of:
  a. structuring said upper surface of said substrate by performing the following steps:
   i. providing said substrate,
   ii. providing a pulsed structuring laser capable of generating a pulsed structuring laser beam capable of engraving the upper surface of the substrate in a non-through manner, the pulsed structuring laser beam having a wavelength of between 200 and 11,000 nm, a sufficient power to create a structuring of the substrate and having pulses of less than 1 µs in duration,
   iii. generating the pulsed structuring laser beam capable of engraving the upper surface of the substrate in a non-through manner, the pulsed structuring laser beam having a wavelength of between 200 and 11,000 nm, a sufficient power to create a structuring of the substrate and having pulses of less than 1 µs in duration,
   iv. providing a displacement device capable of generating a relative motion between the pulsed structuring laser beam and said upper surface of said substrate,
   v. irradiating the upper surface of the substrate with the pulsed structuring laser beam by inducing a relative motion between the pulsed structuring laser beam and the upper surface of said substrate, to generate a first portion of structured upper surface of the substrate comprising a pattern,
  b. providing said part whose surface has a second surface portion comprising a fusible material having a melting point lower than the melting point of said first portion of structured upper surface of the substrate,
  c. placing the first portion of structured upper surface of the substrate in contact with the second surface portion of said part,
  d. applying a pressure so as to maintain contact between said first portion of structured upper surface of the substrate and said second surface portion of the part,
  e. provide a heating device capable of creating a temperature increase in the fusible material sufficient to melt it, and
  f. heating, by means of the heating device, the fusible material so as to reach in the fusible material, a temperature sufficient to melt at least a portion of it in the pattern of the first portion of structured upper surface of the substrate.

The method of assembling of the invention allows to make an assembly between a substrate and a part. The assembly thus made makes it possible to attach a part to a substrate in such a way that there is, for example, a high tensile and shear strength between the substrate and the part. For example, the assembly has no gap between the substrate and the part. For example, the assembly allows a mechanical force to be transferred from the part to the substrate and vice versa without damaging the assembly.

The method of assembling of the invention allows, in comparison with Amend P. et al., Physics Procedia 41, pp 98-105 (2013), to obtain an assembly between a substrate and a part that presents a cohesive failure of the part. The failure type described in the cited document is systematically interfacial. The method of assembling of the invention makes it possible to obtain an assembly with higher mechanical properties in tensile and shear strength than the assemblies described in the cited document. The method of assembling of the invention requires a single light source, whereas it is necessary to use two light sources in the cited document.

For the purposes of this document, a "structuring" of a surface of a substrate is a material removal from said surface of said substrate. A structuring is therefore a type of engraving. For example, a structuring can be a microstructuring or a texturizing. Structuring preferably comprises manufacturing one or more groove(s) in the substrate, regardless of the depth, structure or shape of the groove(s).

For the purpose of this document, a "relative displacement of the structuring beam and the substrate" may comprise a displacement of the structuring beam while the substrate remains motionless, a displacement of the substrate while the structuring beam remains motionless or a displacement of both the structuring beam and the substrate. This relative displacement preferably comprises a translation. This relative displacement may comprise a rotation.

For the purpose of this document, a "re-melted area" of a structured surface having a groove is an area outside the groove that comprises a material that was present in the groove prior to the structuring and that was re-deposited outside the groove during the structuring, thereby forming a relief on the surface near the edge of the groove.

For the purposes of this document, a "pattern", or "structuring pattern", is the shape of all the grooves engraved during the structuring on the substrate surface. The pattern is determined in particular by the beam and substrate relative displacement to each other. For example, a groove according to the invention may be punctual, i.e. it may correspond to a groove defined by a point rather than by a line. For example, a groove is a hole. For example, the hole has the shape of a crater by considering the re-melted areas re-deposited around the hole during the substrate structuring step.

For the purpose of this document, the duration of a laser pulse is the time during which the laser emission of a pulse is present, determined at half the height of the pulse intensity. This duration can be measured, for example, with an autocorrelator for ultra-short pulsed lasers (fs, ps) and a fast photodiode for short pulsed lasers (ns).

The method according to the invention allows to obtain an especially dense structuring pattern, with a high level of roughness at the micrometer scale and/or submicron scale. After an assembling by contacting the pattern with a part and melting material from the part into the pattern, a large contact surface is obtained between the substrate and the re-solidified material from the part, particularly on the side walls of the grooves. This results in an especially strong adhesion between the substrate and the part.

Thanks to the short duration pulses, the effect of the beam is particularly localized. This makes it possible to produce grooves with an especially narrow width. This makes it possible to create an especially precise pattern. In addition, thanks to the short duration pulses, the beam effect on the substrate is athermal or almost athermal.

It is also possible, thanks to the method according to the invention, to structure especially thin substrates without noticeable deformation, because the structuring according to the invention does not heat, or only slightly heats the substrate. These thin substrates have preferably a thickness of less than 1 mm. These thin substrates have preferably a thickness of between 100 μm and 500 μm.

In addition, the method according to the invention allows to structure a substrate comprising a material that would be contaminated by air if heated with air. For example, a material comprising titanium or magnesium can be engraved by the method according to the invention because the structuring according to the invention does not heat, or only slightly heats the substrate and the area subjected to the structuring can easily be placed into an inert atmosphere during the structuring, for example by sending an inert gas stream such as nitrogen over it.

Thanks to the short pulse duration, the structuring method according to the invention allows the structuring of highly reflective materials, such as copper, copper alloys, aluminium, zinc, aluminium alloys, copper and aluminium alloys, gold and silver.

The method according to the invention makes it possible to remove especially little material during the structuring. This results in especially shallow grooves. This prevents an air bubble from being created between the grooves bottom and the material that has penetrated the grooves, during a welding of the substrate with a part. The interconnection between the different grooves made by the method according to the invention also reduces the air amount trapped between the substrate and the material that has penetrated the grooves because it helps to evacuate the air from the grooves.

The invention allows the formation of a structured upper surface of the substrate optimized according to its composition. The invention allows the formation of a structured upper surface comprising a line density optimized according to the substrate composition. Therefore, the structured substrate assembling with the method according to the invention with a part has an excellent adhesion between the substrate and the part. In particular, the tensile strength between the substrate and the part is especially good. For example, the shear strength is especially good. In particular, the shear strength in several directions is especially good.

Preferably, the method of assembling comprising a pre-treatment step to increase an optical absorption of a surface of the substrate and comprising the following steps:

i. irradiating the substrate with a pre-treatment beam to increase the roughness of said surface of the substrate;

ii. impose a relative displacement between the substrate and the pre-treatment beam produced by the pulsed structuring laser by means of the displacement device;

so that the pre-treatment comprises a texturizing of the surface of the substrate which results in a shallower pre-treatment structure than the pattern engraved in step a.v.

The pre-treatment is especially useful for substrates reflecting the welding laser beam wavelength because increasing absorption allows the optimal temperature for melting fusible material from the part to be reached faster.

Preferably, the optical absorption increase of the upper surface of the substrate is achieved by an increase in the roughness of the upper surface of the substrate. Increasing the roughness allows to increase the welding laser beam absorption on the upper surface of the substrate during the welding.

Preferably, the pre-treatment comprises a texturizing of the upper surface of the substrate resulting in a shallower pre-treatment structure than the pattern engraved during step a.v.

Preferably, the pre-treatment takes place after step a.

Using the same displacement device and the same laser for the structuring and the pre-treatment allows to limit substrate handling and to limit the equipment used during the method, therefore saving time and money.

Advantageously, a linear velocity of relative motion between the pre-treatment beam and said upper surface of said substrate during the pre-treatment is at least one and a half times greater than a linear velocity of relative motion of the pulsed structuration laser beam and said upper surface of said substrate with respect to the substrate during step a.v.

The precision of the structure created by the pre-treatment is less important than the precision of the engraving during the structuring. It is therefore advantageous to use a higher speed during the pre-treatment, even if it reduces precision, so that the time taken by the pre-treatment does not have a significant impact on the overall time taken by the pre-treatment and the structuring.

Preferably, the pre-treatment comprises the creation of parallel grooves.

Preferably, the pre-treatment is carried out on the upper surface of the substrate. Since the upper surface of the substrate is the one receiving the structuring pattern, the pre-treatment is then carried out on the upper surface that has not received any structuring. The pre-treatment on the upper surface of the substrate is especially advantageous during the assembling with a part to be welded comprising a transparent material or having a certain transparency to the radiation emitted by the heating device because it allows the absorption of the upper surface of the substrate to be increased by the welding laser. It is then possible to locally heat the upper surface of the substrate by absorbing well the radiation emitted by the heating device through the part to be welded. The pre-treatment is then preferred when the upper surface of the substrate is too reflective of the radiation emitted by the heating device. The pre-treatment is especially recommended for substrates comprising a metal. The pre-treatment allows a faster and better quality welding because it allows a heating at the location of the weld between the substrate and the part to be welded. The heating of the upper surface of the substrate causes the part to be welded to heat up at its contact point with the part. The heating thus allows the local melting of the part to be welded so that a material portion of the part to be welded penetrates into the grooves of the pattern obtained by structuring on the upper surface of the substrate.

Advantageously, the pre-treatment allows an increase in the contact surface between the substrate and the welded part (increase in the weld surface), which results, for example, an increase in the tensile strength of the assembly.

Preferably, the pulses of the pulsed structuration laser beam have a duration of between $10^{-15}$ s and $10^{-6}$ s and more preferably between $10^{-14}$ s and $10^{-8}$ s.

Preferably, the power of the pulsed structuration laser beam is at least 0.01 W more preferably at least 1 W and even more preferably at most 100 W. These laser beam powers represent sufficient powers to create a structuration of the substrate.

Preferably, the intensity of the pulsed structuration laser beam is at least 10 W/mm$^2$, more preferably at least 50 W/mm$^2$ and even more preferably at least 100 W/mm$^2$. These laser beam intensities represent sufficient intensities to create a structuration of the substrate.

Advantageously, the pulsed structuring laser beam has a wavelength of between 200 and 11,000 nm, more advantageously between 1,000 and 1,100 nm, and even more advantageously between 1,030 and 1,070 nm.

In an embodiment of the invention, the pulsed structuring laser beam has a repetition rate of between 1 KHz and 2 MHz.

For the purpose of this document, the "repetition rate" of a pulsed laser beam is the number of pulses of the laser beam per time unit.

In an embodiment of the invention, the relative motion of the pulsed structuring laser beam with respect to the substrate is done at a linear velocity of between 10 and 10,000 mm/s, more preferably between 100 and 5,000 mm/s. A linear velocity in this last interval allows both a good production rate of structured substrate and a structuring precision on the grooves resulting in a good adhesion quality.

In an embodiment of the invention, at least a portion of the upper surface of the substrate comprises a metal. In particular, the metal comprises at least one element or compound selected from: aluminium, copper, titanium, magnesium, steel, mild steel, high yield strength steel, very high yield strength steel, ultra-high yield strength steel, stainless steel and alloy.

Advantageously, at least a portion of the upper surface of the substrate comprises a ceramic material or glass.

In an embodiment of the invention, the heating device is a welding laser capable of producing a welding laser beam capable of heating by irradiation the first structured upper surface portion of the substrate and in which the part is at least partially transparent to the welding beam. Preferably, the first structured upper surface portion of the substrate is heated by said heating device.

The welding laser may be different from the structuring laser. Indeed, the structuring can be done in a different workshop from the one in which the assembling is carried out. In addition, the welding beam characteristics may differ from those of the structuring beam.

Preferably, the part comprises of a polymer or glass.

In an advantageous way, the method comprises the following characteristics: the pulses of the pulsed structuring laser beam have a duration of between $10^{-15}$ s and $10^{-6}$ s and a power of at least 0.01 W; the intensity of the pulsed structuring laser beam is at least 10 W/mm$^2$; the pulsed structuring laser beam has a wavelength of between 1,000 and 1,100 nm; the pulsed structuring laser beam has a repetition rate of between 1 KHz and 2 MHz; the relative motion of the pulsed structuring laser beam with respect to the substrate is done at a linear velocity of between 10 and 10,000 mm/s.

Preferably, the pulsed structuring laser beam (32) has a wavelength of 1,064 nm or 1,030 nm.

As described above, the structured substrate as obtained by the structuring step of the method of assembling is particularly suitable for welding the substrate to a part. Indeed, the weld resulting from the welding process has an excellent adhesion between the substrate and the part. In particular, the tensile and shear strengths between the substrate and the part are particularly good.

Preferably, the pattern has a larger component in one direction than in another.

These two directions are preferably coplanar with the first and second directions. The pattern can be designed to have a larger component in one direction in which greater traction is expected than in another direction in which less traction is expected. The inventors found that the shear strength is better in the direction in which the pattern has a greater component.

Preferably, the pattern comprises a plurality of lines, each line corresponding to a groove engraved in the substrate.

For the purposes of this document, a "line" is a line whose one dimension, the length, is much larger than another dimension, the width. A line corresponds to a groove engraved during the structuring. A line is preferably continuous, but may comprise one or more discontinuities whose size is small in relation to the length of the line. A line can be curved, broken, zigzagged, comprises line segments, be the contour of a surface, . . . . Typically, the line length of the pattern corresponds to the direction of the relative displacement of the beam and the substrate.

The groove width is the minimum distance between two groove edges, measured in a plane that extends the surface of the substrate. The groove width is typically perpendicular to the groove length.

The groove depth is the distance between the groove bottom, i.e. the point of the groove furthest from the surface of the substrate, and the extension of the surface of the substrate. The depth is measured perpendicular to the extension of the surface of the substrate.

The distance between two grooves is the minimum distance between the edges closest to the two grooves. It is measured along the surface of the substrate.

A pattern with lines is particularly advantageous because, since post-assembling adhesion is mainly caused by the interlocking due to the fusible material present in the grooves, lines provide better adhesion than a set of points or a full surface because their geometry results in better mechanical tensile and shear strength.

A pattern comprising lines allows to increase the area of the upper surface of the substrate, allowing a larger contact surface between the substrate and the part on a given surface of the substrate than an unstructured upper surface of the substrate. In the case of a structured substrate, the area of the upper surface of the substrate also takes into account the grooves side walls, the grooves lower wall and the possible re-melted area along the grooves.

Preferably, the plurality of lines of the pattern comprises a first line and a second line such that there is a straight line intersecting successively the second line, the first line and the second line. The first line is then "imbricated" into the second line.

The imbrication of the lines allows an interlocking of the substrate and the part especially resistant to tensile and shear strength.

The pattern advantageously comprises broken lines.

For the purposes of this document, "a broken line" is a line comprising two non-parallel segments. A broken line can be, for example, a zigzag line.

The use of broken lines gives great freedom in the choice of pattern, and in particular allows the pattern to be adapted to the substrate, the part, the assembly, the use of a welded assembly comprising the substrate and the part assembled together. An optimal use of broken lines requires an optimal ratio between grooved and non-grooved surfaces to be respected. The optimal use of broken lines also comprises the choice of a pattern formed by broken lines with different orientations in order to obtain better assembly mechanical properties.

In an embodiment of the invention, the pattern comprises a repletion of geometric shapes.

For the purposes of this document, a geometric shape may consist of the lines forming the contour of said shape or may comprise the inner surface of said shape. The geometric shapes repetition allows a certain uniformity of the pattern on the surface and therefore a uniformity of the adhesion after assembling.

Preferably, repeated geometric shapes comprise a plurality of concentric geometric shapes.

This allows to have a large total pattern surface.

In an embodiment of the invention, the repeated geometric shapes comprise a plurality of diamonds, squares, triangles, rectangles or hexagons.

Geometric shapes allowing paving, such as diamond, square, rectangle, triangle or regular hexagon, allow a large pattern total surface because they allow good surface coverage and good shear and tensile strength of the assembly in several directions.

Advantageously, the repeated geometric shapes are arranged in a plurality of rows.

Preferably, a first geometric shapes row and a second geometric shapes row are such that there is a straight line successively intersecting a geometric shape of the second row, a geometric shape of the first row and a geometric shape of the second row.

The first geometric shapes row is then "imbricated" in the second geometric shapes row. This imbrication allows to have a large pattern total surface.

Preferably, the structured surface comprises a geometric shape density per $mm^2$ of between 10,000 and 0.1. Geometric shape density per surface unit corresponds to the geometric shapes number, imbricated or not, that are comprised in a surface corresponding to a surface unit. For example, 10 imbricated diamonds arranged on a surface of 1 $mm^2$ gives a geometric shapes surface density of 10 per $mm^2$.

The invention makes it possible to optimize the type of geometric shapes and their density according to the substrate composition in order to obtain an assembly with, for example, a thermoplastic material, said assembly demonstrating a cohesive rupture of the thermoplastic material.

In an embodiment of the invention, the pattern comprises parallel lines or curved lines.

Preferably, the pattern comprises a line density of between 100 lines per $mm^2$ and 0.2 lines per $mm^2$. Line density per surface unit corresponds to the number of lines, straight lines, curves, intersecting or parallel that are comprised in a surface corresponding to a surface unit. For example, 16 curved or zigzag lines arranged on a surface of 1 $mm^2$ gives a line surface density of 16 per $mm^2$.

Preferably, the grooves have a width of 5 to 500 μm, more preferably of 50 to 120 μm. This last width interval allows especially good adhesion after welding.

Preferably, the grooves have a depth of 1 μm to 2 mm, more preferably of 5 to 500 μm and even more preferably of 10 to 200 μm. The inventors found that this last depth interval is optimal for adhesion. A depth close to 100 μm is especially preferred.

Preferably, two adjacent grooves have a distance between them of minimum 5 μm, more preferably, of minimum 50 μm. Preferably, two adjacent grooves have a maximum distance between them of 5 mm, more preferably, of 1 mm. Preferably, two adjacent grooves have a distance between them of minimum 5 μm and maximum 5 mm. Such distances between the grooves allow a large pattern total surface.

Preferably, the substrate also comprises re-melted areas along the grooves, the re-melted areas having a height of less than 80 μm with respect to the upper surface of the structured substrate, more preferably they have a height of less than 10 μm.

Preferably, the area occupied by said grooves on the upper surface represents 0.001 to 0.85 of the area of said first upper surface portion, preferably represents 0.2 to 0.8 and even more preferably represents 0.4 to 0.6.

In an advantageous way:

said substrate is made of aluminium; said part is made of transparent thermoplastic such as transparent polycarbonate; said structuring laser is used for the pre-treatment step with a power of 50 W, the pulses of the pulsed structuring laser beam used for the pre-treatment step have a duration of $10^{-7}$ s, a repetition rate of 80 kHz, the relative motion of the pulsed structuring laser beam used for the pre-treatment step with respect to the substrate is done at a linear velocity of 3,900 mm/s; said structuring laser is used for the structuring step with a power of 20 W, the pulses of the pulsed structuring laser beam used for the structuring step have a duration of $10^{-7}$ s, a repetition rate of 20 kHz, the relative motion of the pulsed structuring laser beam used for the structuring step with respect to the substrate is done at a linear velocity of 720 mm/s; said pattern comprises a plurality of diamonds having a large diagonal of 2 mm and a small diagonal of 1 mm; the area occupied by said grooves and said re-melted areas along said grooves on the upper surface represents 0.32 of the area of said first upper surface portion.

In an advantageous way:

said substrate is made of galvanized steel; said part is made of polypropylene; said structuring laser is used for the structuring step with a power of 50 W, the pulses of the pulsed structuring laser beam used for the structuring step have a duration of $10^{-7}$ s, a repetition rate of 20 kHz, the relative motion of the pulsed structuring laser beam used for the structuring step with respect to the substrate is done at a linear velocity of 720 mm/s; said pattern comprises a plurality of diamonds spaced 100 μm apart; the area occupied by said grooves and said re-melted areas along said grooves on the upper surface represents 0.79 of the area of said first upper surface portion.

In an advantageous way:

said substrate is made of galvanized steel; said part is made of polypropylene; said structuring laser is used for the structuring step with a power of 50 W, the pulses of the pulsed structuring laser beam used for the structuring step have a duration of $10^{-7}$ s, a repetition rate of 20 kHz, the relative motion of the pulsed structuring laser beam used for the structuring step with respect to the substrate is done at a linear speed of 300 mm/s; said pattern comprises a plurality of diamonds spaced 80 μm apart; the area occupied by said grooves and said re-melted areas along said grooves on the upper surface represents 0.81 of the area of said first upper surface portion.

Preferably, the structured substrate has a surface extending in a first and a second non-parallel direction and comprising a pattern engraved in a non-through manner on the upper surface of the substrate, the pattern extends at least partially in the first direction and the second direction and comprises a plurality of broken lines, each broken line corresponds to a groove.

Advantageously, the pattern comprises a first broken line and a second broken line such that there is a straight line intersecting successively the second broken line, the first broken line and the second broken line. In an embodiment of the invention, the pattern comprises a repetition of geometric shapes, the contour of each geometric shape corresponding to a broken line.

According to a second aspect, the invention concerns an assembly comprising a substrate and a part obtained by the method of assembling according to the first aspect of the invention. The different variants and advantages described for the method according to the first aspect of the invention apply to the assembly of the second aspect, mutatis mutandis.

According to a third aspect, the invention concerns a device for assembling a substrate with a part, said substrate having an upper surface and a lower surface, said part having a surface that has a second surface portion comprising a fusible material having a melting point lower than the melting point of said upper surface of said substrate, said device comprising:

a pulsed structuring laser capable of generating a pulsed structuring laser beam capable of engraving said upper surface of said substrate in a non-through manner, the pulsed structuring laser beam having a wavelength of between 1,000 and 1,100 nm, a sufficient power to create a structuring of the substrate and having pulses of less than 1 μs in duration;

a displacement means capable of generating a relative motion between said pulsed structuring laser beam and said upper surface of said substrate;

a contacting means for contacting said surface of said part with said upper surface of said substrate;

a compression means;

a heating device capable of creating a sufficient temperature increase in said fusible material to melt at least a portion of it;

said structuring laser and said displacement means being configured to impose on said laser beam a relative motion between said pulsed structuring laser beam and said upper surface of said substrate to generate a pattern formed by a plurality of grooves engraved on a first portion of said upper surface of said substrate;

said contacting means being configured to arrange the first portion of the upper surface of said substrate comprising said pattern in contact with the second surface portion of said part;

said compression means being configured to impose a compression force between the first portion of upper surface of said substrate comprising said pattern and the second surface portion of said part;

said heating device being configured to melt at least a fusible material portion of said part into said plurality of grooves of said pattern of the first portion of upper surface of the substrate;

said fusible material of said part being capable of solidifying inside said grooves of said pattern of the substrate to create a junction between said part and said substrate forming an assembly comprising said part and said substrate.

The different variants and advantages described for the method according to the first aspect of the invention and for the assembly according to the second aspect of the invention apply to the device according to the third aspect, mutatis mutandis.

BRIEF DESCRIPTION OF THE DRAWINGS

Other characteristics and advantages of the invention will appear when reading the following detailed description, for the understanding of which reference will be made to the attached drawings among which.

EMBODIMENTS OF THE INVENTION

The present invention is described with particular embodiments and references to figures but the invention is not limited by them. The drawings or figures described are only schematic and are not limiting.

In the context of this document, the terms "first" and "second" are used only to differentiate between the different elements and do not imply an order between them.

In the figures, identical or similar elements may have the same references.

Figure 1:
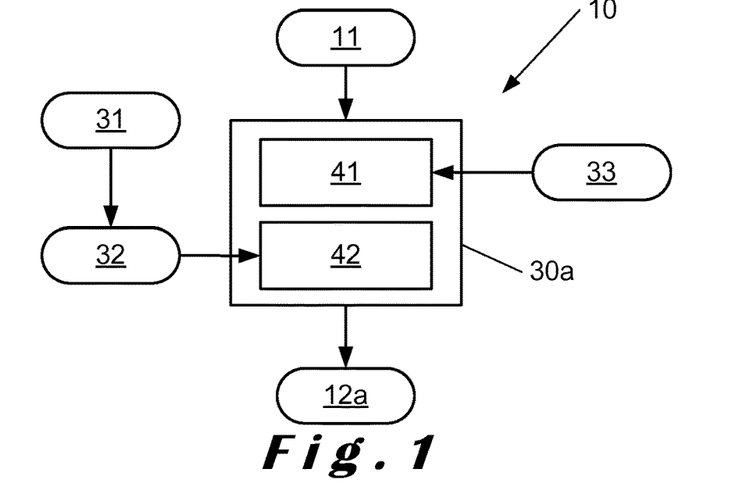
FIGS. 1 and 2 illustrate the steps of a substrate structuring step comprised in the method according to the invention.
Figure 4:
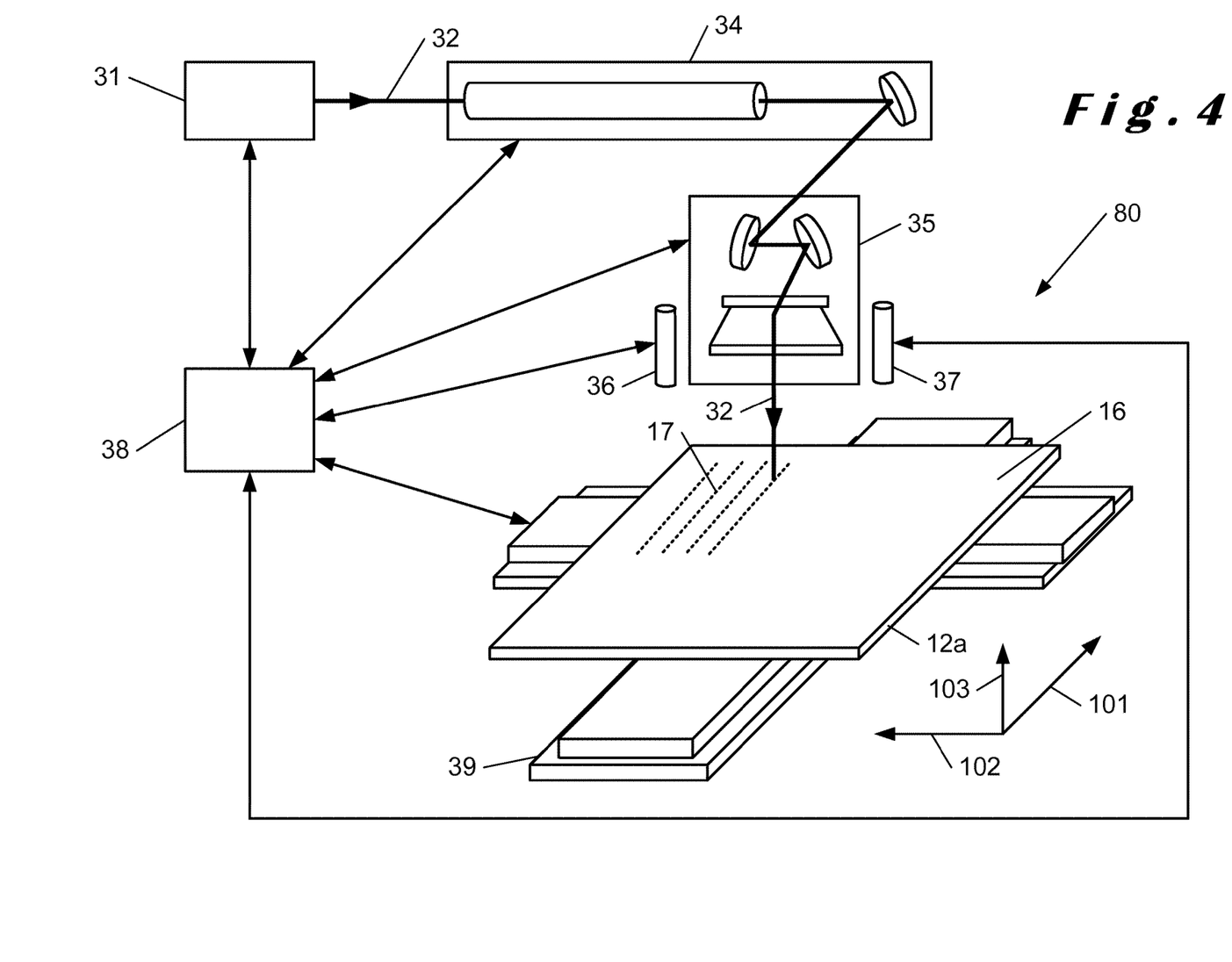
FIG. 4 illustrates an assembling device and more particularly allowing the substrate structuring according to the invention.

FIG. 1 illustrates the structuring step 10 of a substrate 11 according to the method of the invention. The structuring step 10 uses a structuring laser 31 which emits a pulsed structuring beam 32 capable of engraving an upper surface 16 of the substrate 11, the upper surface 16 extending in a first direction 101 and a second direction 102, the first direction 101 and the second direction 102 not being parallel. The upper surface 16 and directions 101, 102 are shown in FIG. 4. The structuring step 10 also uses a displacement device, to move the structuring beam 32 and the substrate 11 relative to each other.

A structuring 30a comprises an irradiation 42 of the upper surface 16 and a relative motion 41 of the structuring beam 32 and the substrate 11. The irradiation 42 and the motion 41 are preferably simultaneous. However, it is possible that they may be successive, and in particular that they may be repeated many times in succession.

As the structuring 30a results in a pattern 17 formation on the upper surface 16 of the substrate 11, the result is a substrate 12a with a pattern. This one can then be used in a subsequent weld 130 (FIG. 3) comprised in the method of assembling.

Substrate 11 preferably comprises a metal on the upper surface 16 irradiated or comprises a metal portion on the upper surface 16 irradiated. For example, this metal may comprise an element or compound selected from the following: aluminium, copper, titanium, magnesium, zinc, steel, mild steel, high yield strength steel, very high yield strength steel, ultra-high yield strength steel, stainless steel and alloy. The substrate 11, or a portion thereof, may also comprise a ceramic material or glass. The upper surface 16 is preferably flat. The upper surface 16 can also be curved.

The structuring laser 31 is preferably a pulsed laser. The structuring laser 31 is preferably a laser capable of sending pulses with a duration of less than 1,000 ns, more preferably between $10^{-15}$ s and $10^{-6}$ s, even more preferably between $10^{-14}$ s and $10^{-8}$ s.

The structuring laser 31 and the structuring beam 32 allow to have a pulsed structuring beam 32 with a repetition rate of between 1 KHz and 2 MHz. The structuring laser 31 is preferably capable of emitting a beam with an intensity of at least 10 W/mm², more preferably 50 W/mm², even more preferably 100 W/mm². The structuring laser 31 is capable of emitting a beam with a power of at least 0.01 W, preferably 0.1 W, more preferably 1 W, even more preferably 100 W. The structuring laser 31 is capable of emitting a beam with a wavelength of between 200 and 11,000 nm, preferably between 300 and 2,000 nm, more preferably between 1,000 and 1,100 nm, even more preferably between 1,030 and 1,070 nm.

For the purposes of this document, the "power" of a pulsed laser beam is the average power of that beam, i.e. the energy integration of all integrated pulses into a fixed duration divided by that duration.

For the purpose of this document, the "intensity" of a pulsed laser beam is the ratio between the power of that beam and the surface area irradiated by that beam.

The parameters of the structuring laser 31 for the production of the structuring beam 32 are chosen according to the substrate 11, so that the irradiation 42 removes material from the substrate 11. The parameters of the structuring laser 31 are preferably kept constant throughout the duration of the structuring 30a.

The relative motion 41 may comprise a displacement of the structuring beam 32, a displacement of the substrate 11 or displacements of both. The motion 41 may comprise a rotation, comprising a rotation of the substrate 11, especially if the upper surface 16 is not flat. In an embodiment of the invention, which is shown in FIG. 4, the displacement device 33 comprises a scanner head 35 capable of displacing the structuring beam 32 and a displacement device 39 of the substrate 11.

The irradiation 42 removes material from the surface 11, for example by vaporization or sublimation. It thus creates a non-through groove whose depth and width are essentially determined by the structuring beam characteristics and the speed of the motion 41. The motion 41 causes the irradiation 42 to occur at different points on the upper surface 16, creating thus a predefined pattern 17. The pattern 17 is preferably programmed on a computer 38 (visible FIG. 4) which guides the motion 41 by means of the displacement device 39 of the substrate 11 and of the scanner head 35 (visible FIG. 4). The pattern 17 preferably comprises lines 18, more preferably broken lines.

Figure 2:
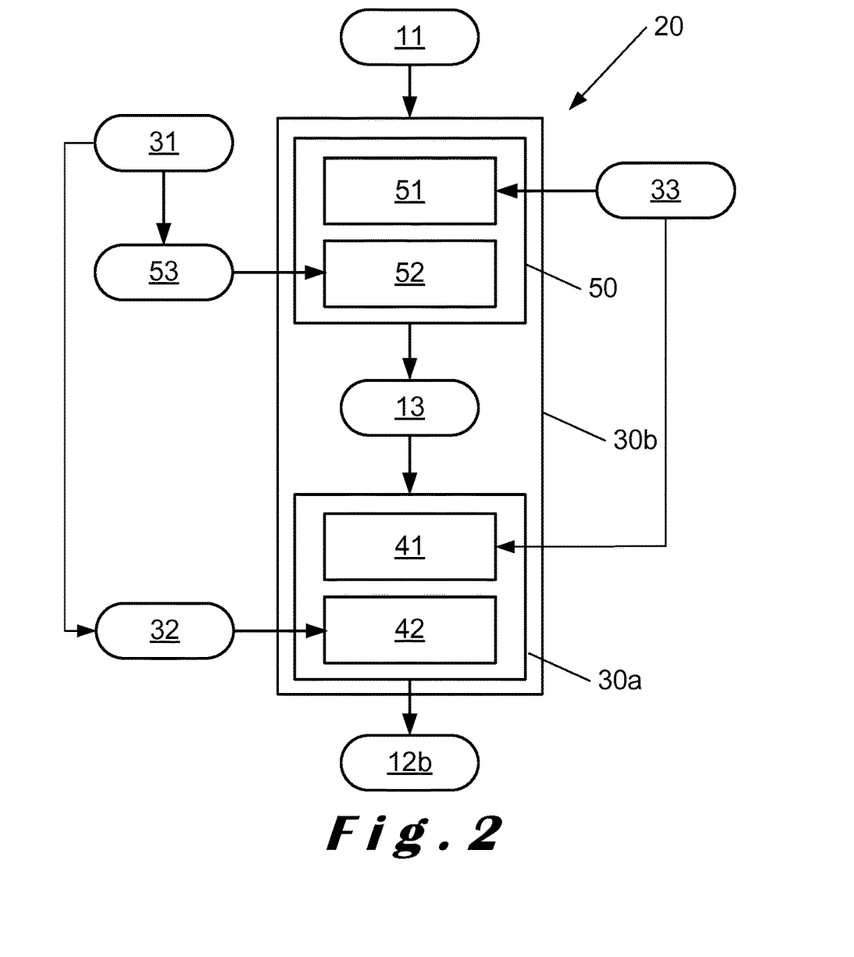

FIG. 2 illustrates a structuring step 20 of a substrate 11 according to the method of the invention. The structuring step 20 uses the same elements (substrate 11, structuring laser 31, structuring beam 32, displacement device 33) and goes through the same steps (relative displacement 41, irradiation 42 i.e. creation of the pattern by structuring 30a) than the structuring step 10. The structuring step 20 adds a pre-treatment 50. Thus, structuration 30b comprises the pre-treatment 50 and the structuring 30a of the pattern.

The pre-treatment step 50 preferably comprises a texturizing of the surface 16 of the substrate. The texturizing comprises the creation of a texturizing structure, which is shallower than the grooves in the structuration pattern 17. The texturizing structure preferably comprises texturizing grooves.

The pre-treatment step 50 preferably comprises a relative pre-treatment displacement 51 and a pre-treatment irradiation 52 during which the surface 16 is irradiated by a pre-treatment beam 53 emitted by the structuring laser 31. The pre-treatment beam 53 is preferably pulsed. The irradiation 52 and the displacement 51 are preferably simultaneous. However, it is possible that they may be successive, and in particular that they may be repeated many times in succession. The irradiation 52 and the displacement 51 generate a substrate 13 with a texture.

During the pre-treatment step 50, the structuring laser 31 send preferably pulses with a duration of less than 1,000 ns. During the pre-treatment 50, the structuring laser 31 preferably has a repetition rate of 1 KHz to 500 KHz. During the pre-treatment step 50, the structuring laser 31 preferably has a power of 1 W to 100 W. During the pre-treatment step 50, the structuring laser 31 preferably has an energy of 0.01 to 100 mJ.

The relative pre-treatment displacement 51 is performed according to a predefined pre-treatment scheme. The relative pre-treatment displacement 51 is preferably performed with a higher linear velocity than the relative motion 41 of the structuring 30a of the pattern, so that the time taken by the pre-treatment 50 does not have a significant impact on the overall time taken by the structuring 30b which comprises the pre-treatment 50 and the structuration 30a of the pattern. For example, the relative displacement 51 linear velocity of the pre-treatment beam 53 during the pre-treatment 50 with respect to the substrate 11 may be at least one and a half times greater than the relative displacement linear velocity of the structuring beam 32 during the relative displacement 41, preferably at least four times greater. For example, the relative displacement 51 linear velocity of the pre-treatment beam 53 during the pre-treatment 50 can be between 1,000 and 10,000 mm/s. In particular, the relative displacement 51 linear velocity of the pre-treatment beam 53 during the pre-treatment 50 can be between 3,000 and 5,000 mm/s.

Figure 3:
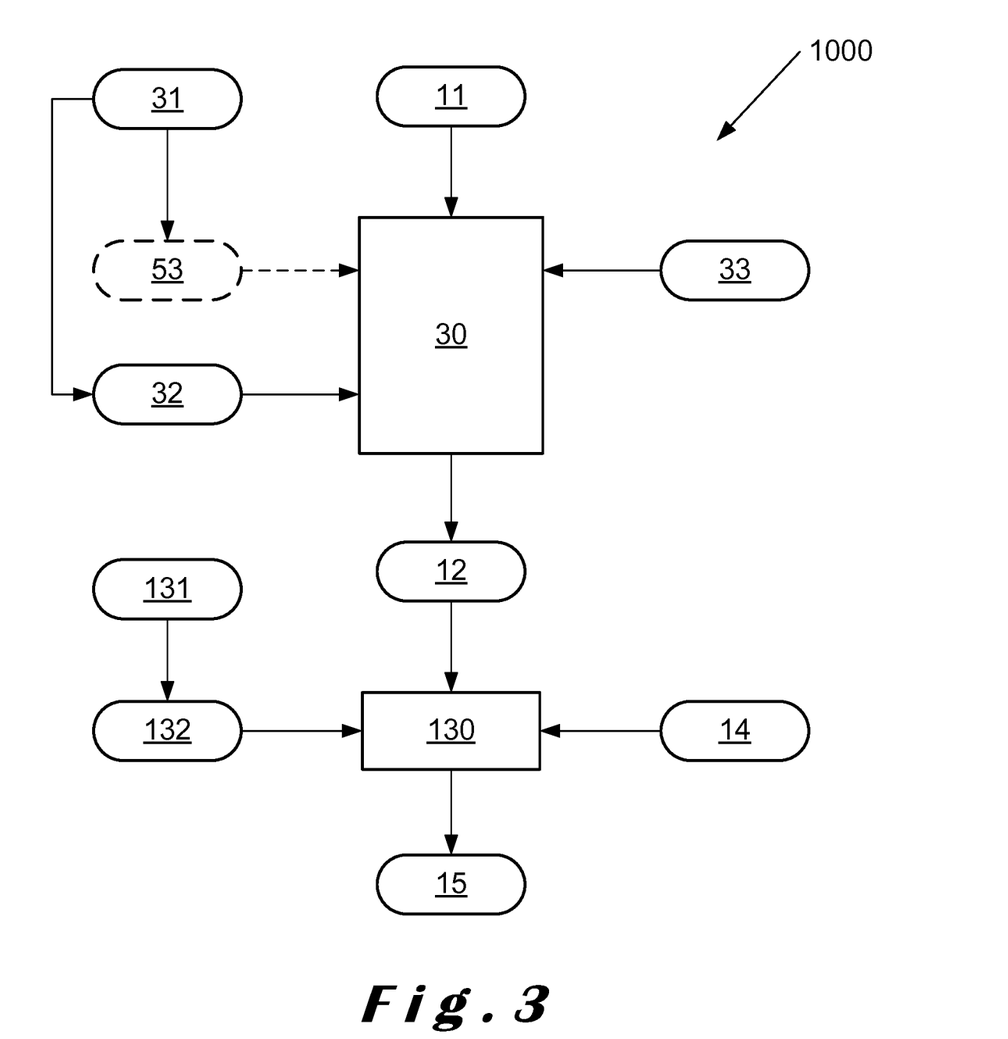
FIG. 3 illustrates steps of a method of assembling according to the invention.

Following the pre-treatment 50, the substrate 13 with a texture follows the steps of relative motion 41 and irradiation 42 engraving 30*a* on it the predefined structuring pattern, so as to form a substrate 12*b* with texture and pattern that can be used in a subsequent assembling 130 (FIG. 3).

In a variant of the structuring method 20 according to the second embodiment of the invention, another laser than the structuring laser 31 used for the irradiation 42 of the structuring 30*a* is used for the pre-treatment irradiation 52 and/or another displacement device than the displacement device 33 used for the structuring 30*a* is used for pre-treatment relative displacement 51.

In a variant of structuring method 20, the pre-treatment 50 takes place after the motion 41 and irradiation 42 steps of structuring 30*a* creating the pattern.

The pre-processing may, for example, involve engraving a plurality of parallel lines. The lines can be 50 µm apart, for example. The lines can be 50 µm wide, for example. For example, the lines can have a depth of between 4 and 7 µm. The texturizing created by the pre-treatment preferably covers the entire portion of the surface 16 which will then be irradiated by a welding beam 132 (FIG. 3).

The main function of the pre-treatment 50 is to increase the absorption of a welding beam 132 on the surface 16 during assembling welding 130 (FIG. 3) by increasing the roughness of the surface 16 of the substrate.

FIG. 3 illustrates a method of assembling according to the invention. The method of assembling comprises the step 10 of structuring a substrate 11 in which case it results from the structuring 30 the substrate 12*a* with pattern, or step 20 of structuring a substrate 11 in which case it results from the structuring 30 the substrate 12*b* with texture and pattern. Substrate 12*a* with pattern and substrate 12*b* with texture and pattern are comprised in the description of the FIG. 3 as "substrate 12 with (texture and) pattern". The portion of the surface 16 of the substrate 12 with (texture and) pattern that will be welded is called first surface portion 117.

The method of assembling uses a part 14 having a surface. The portion of the surface of the part 14 that must be joined is called second surface portion 116. The second surface portion 116 comprises a fusible material having a melting point lower than the melting point of the first structured surface portion 117 of the substrate so that a localized heating, created by a heating device 113, can melt the fusible material of the part without melting the first structured surface portion 117 of the substrate. The part 14 preferably comprises a polymer and/or glass. The second surface portion 116 can be flat or curved.

The method of assembling also uses a heating device 131 capable of creating a temperature increase in the fusible material sufficient to melt it. The heating device 131 can be a welding laser, which is preferentially different from the structuring laser 31. Indeed, the structuring 30 can be done in a different workshop from the one in which the assembling 130 is carried out.

In the case where the heating device 131 is a welding laser, the welding laser emits a welding beam 132 capable of passing through the part 14 and heating by irradiation the first portion 117 of the surface 16 which was structured during the structuring 30. In other words, the wavelength and other characteristics of the welding beam 132 are chosen so that the welding beam 132 is at least partially transmitted by the part 14 and at least partially absorbed by the first surface portion 117.

During an assembling step 130, the second surface portion 116 is contacted with the first surface portion 117. The assembling step 130 comprises a step of contacting the structured substrate 12 with the part 14 and a compression step. The welding beam 132 is sent over the first surface portion 117 through the part 14 in order to irradiate the first surface portion 117.

The absorption of the welding beam 132 by the first surface portion 117 of the substrate 12 causes an increase in its temperature. The temperature increase is selected such that it melts material from a fusible material of the second surface portion 116 of the part 14 that enters the grooves of the pattern 17 engraved on the first surface portion 117. Upon cooling, this material from the part 14 solidifies, blocking the second surface portion 116 with the first surface portion 117, i.e. causing an adhesion between the substrate 12 and the part 14, so as to form a welded assembly 15. In addition, the temperature increase can be chosen such that it does not melt the first portion 117 of structured upper surface 16 of the substrate 12, i.e. the temperature reached in the first portion 117 of structured upper surface 16 of the substrate 12 is lower than its melting temperature.

The temperature increase is all the greater as the absorption of the welding beam 132 by the first surface portion 117 of the substrate 12 is large. It is therefore advantageous to carry out the pre-treatment 50 (FIG. 2), in order to make the first surface portion 117 rougher and therefore more able to absorb the welding beam 132. It is also possible, while remaining within the scope of the invention, that the assembling may be carried out by a heating device 131 other than a laser. The heating device 131 can, for example, heat the substrate 12 by conduction.

In an embodiment of the invention, the contact means is a device having gripping means of the gripper type or vacuum gripping means. These gripping means are preferably equipped with an arm allowing the supplying of the part 14. These gripping means can also allow, once the assembling of the structured substrate 12 and the part 14 has been completed, to transport the assembly to a gathering area for the assemblies and to bring a new substrate to be structured so that a new assembly can be made with a new part. These gripping means make it possible to bring the portion 116 of the part 14 intended to be assembled with the portion 117 of the upper surface 16 of the substrate 11 comprising said pattern 17.

In an embodiment of the invention, a mechanical pressure is applied to maintain contact between the second surface portion 116 and the first surface portion 117 during the irradiation by the welding beam. The application of this mechanical pressure corresponds to a compression step. This pressure also promotes the fact that the material of the fusible material of the second surface portion 116 of the part 14 enters the grooves of the pattern 17 structured on the first surface portion 117. This pressure can be applied, for example, by means of a pressurizing device 140.

In an embodiment of the invention, the assembling 130 comprises a displacement of the welding beam 132 and/or the second surface portion 116 contacted with the first surface portion 117, in order to allow the welding on a surface substantially larger than the welding beam 132 diameter.

The method of assembling can be used in particular in the assembling of a bulb holder for lighting applications in the automotive industry.

FIG. 4 illustrates a structuring device 80 used in the structuring step 10; 20 to perform the structuring 30*a* of the pattern, and potentially the pre-treatment 50. The device 80 comprises the structuring laser 31 which emits the structuring beam 32 toward an optical path 34 which shapes the beam 32. The optical path 34 comprises different optical elements, for example at least one of: a mirror, a lens, a beam expander/collimator, an attenuator, a polarizer. The optical path 34 sends the beam 32 toward a scanner head 35 which preferably comprises tilting mirrors and an ocular lens and is capable of directing the beam 32 to the surface 16 of the substrate. The device 80 also preferably comprises a vision system 36, and a confocal measuring system 37. The device 80 also comprises a displacement device 39 of the substrate. The displacement device 39 preferably allows the substrate to be translated in a first direction 101, a second direction 102, and a third direction 103 and to rotate the substrate about at least two rotation axes.

In an embodiment of the invention, a computer 38, which can be a tablet, controls the structuring laser 31, the optical path 34, and the scanner head 35, the vision system 36, the measuring system 37 and the displacement device 39.

The pattern 17 preferably comprises a plurality of lines. The pattern 17 can comprise lines that are straight, curved, broken, polygon-shaped, open, closed, . . . . Examples of embodiments of the pattern 17 are illustrated in FIGS. 5 to 8.

Figure 5:
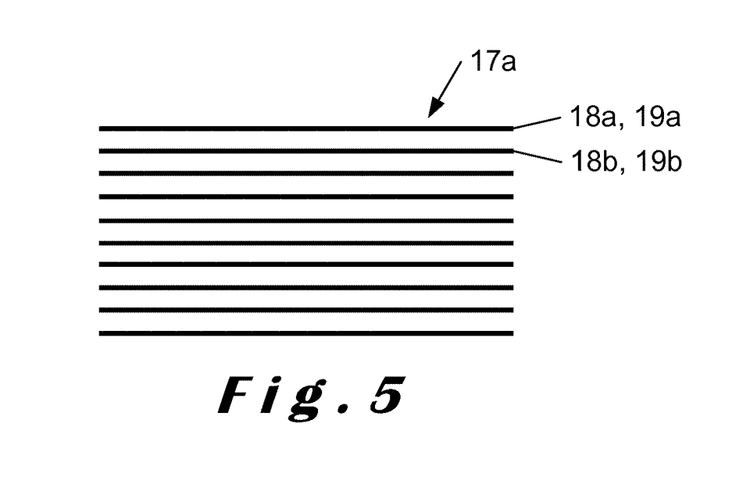
FIGS. 5, 6, 7 and 8 illustrate a first, second, third and fourth example respectively, of patterns engraved during the structuring step of the method according to the invention.

FIG. 5 illustrates a first example of pattern 17*a*, comprising a plurality of parallel lines 18*a*, 18*b*, . . . spaced by a constant distance. Each line 18 is also a geometric shape 19.

Figure 6:
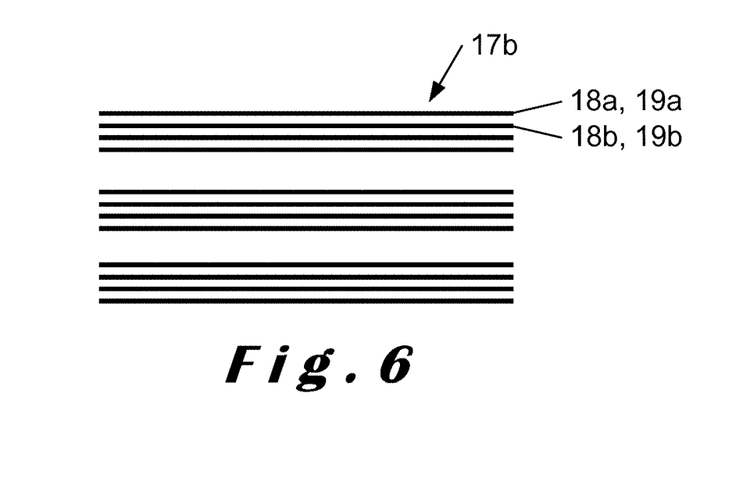

FIG. 6 illustrates a second example of pattern 17*b*, comprising a plurality of grouped parallel lines 18*a*, 18*b*, . . . . Each line 18 is also a geometric shape 19.

Figure 7:
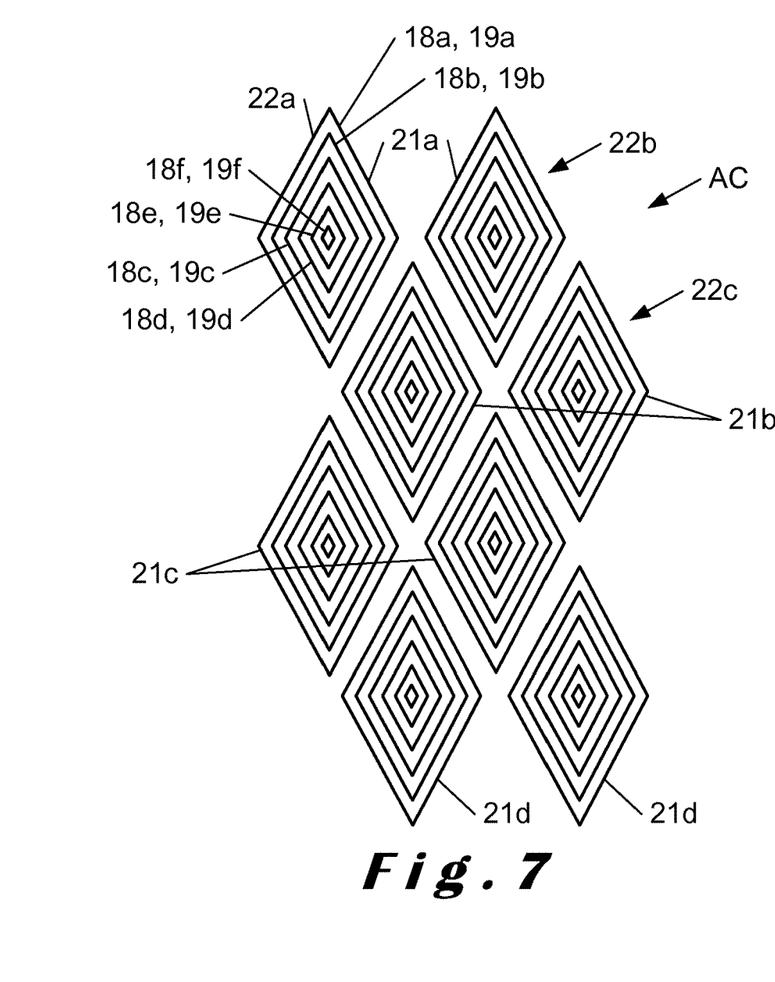
Figure 8:
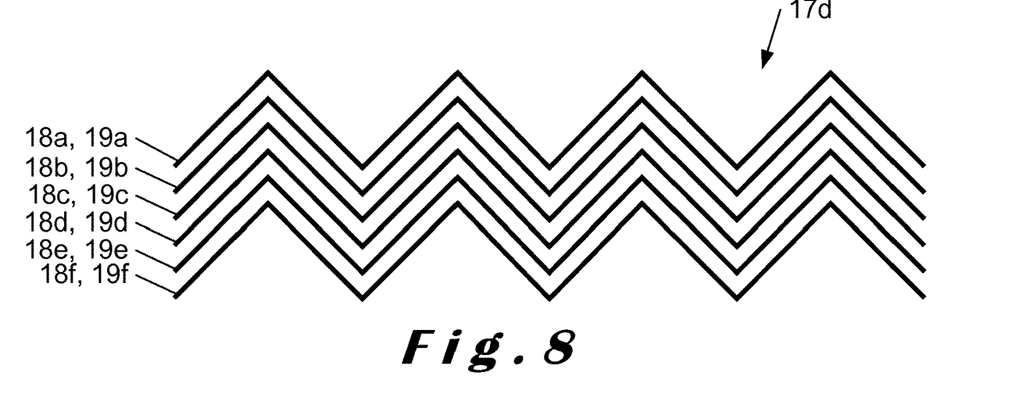

FIG. 7 and FIG. 8 illustrate two examples of pattern realization in which the pattern comprises a first line and a second line such that the first line is imbricated in the second line.

FIG. 7 illustrates a third example of pattern 17*c*. The pattern 17*c* comprises lines 18*a*, 18*b*, . . . . The lines 18 are geometric shapes 19, more precisely diamonds. It is possible that the shapes are squares, rectangles, hexagons, triangles, while remaining within the scope of the invention. In particular, they can be shapes that allow the surface to be paved. The shapes 19 are preferably reproduced in such a way as to cover at least 80% of the adhesion surface. For example, they can be reproduced between 4 and 60 times.

The forms 19 are grouped into groups 22, each group 22 comprising a plurality of concentric forms. The groups 22 are arranged in rows 21, so that a first row 21*a* is imbricated in a second row 21*b*.

The inventors found that for a pattern such as the one in FIG. 8, where the vertical component is larger than the horizontal component, the shear strength after assembling is better in the vertical direction than in the horizontal direction.

FIG. 8 illustrates a fourth example of pattern 17*d*. The pattern 17*d* comprises lines 18*a*, 18*b*, . . . . The lines 18 are geometric shapes 19, more precisely zigzags comprising line segments. The lines 18 are imbricated within each other. The line segments of a zigzag form 90° angles in the figure, but it would be possible for them to alternately form sharp and obtuse angles while remaining within the scope of the invention.

As shown in FIGS. 5 to 8, the geometric shapes 19 are preferably repeated, with the outline of each geometric shape corresponding to a broken line.

FIGS. 9 to 12 illustrate grooves sections engraved by the method according to the invention. In these sections, the vertical direction corresponds to grooves depth, and the horizontal direction corresponds to the width of the grooves.

Figure 9:
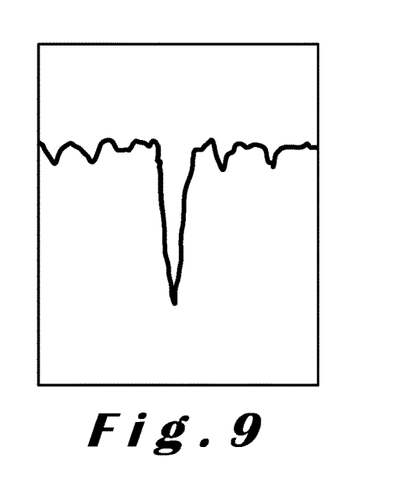
FIGS. 9, 10, 11 and 12 illustrate a first, second, third and fourth example, respectively, of engraved groove section during the structuring step of the method according to the invention.
Figure 10:
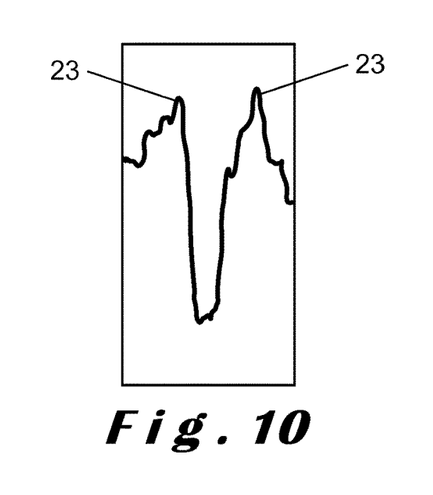
Figure 11:
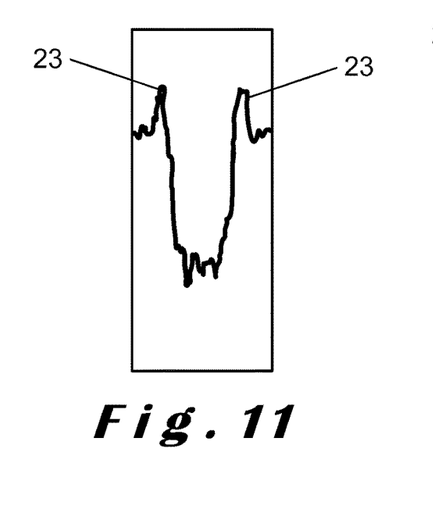
Figure 12:
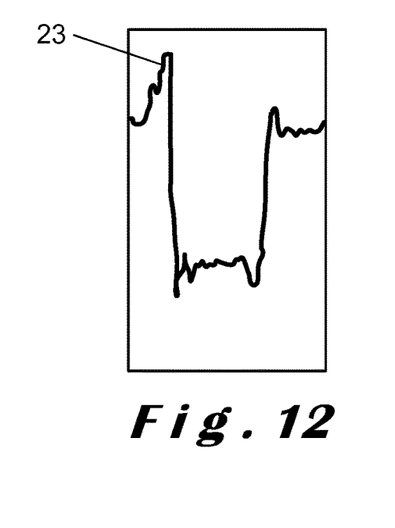

FIG. 9 illustrates a first example of a groove section. FIG. 10 illustrates a second example of a groove section. FIG. 11 illustrates a third example of a groove section. FIG. 12 illustrates a fourth example of groove section. The grooves can be V-shaped (FIGS. 9, 10) or U-shaped (FIG. 11, 12). The grooves may not have a re-melted area 23 (FIG. 9), may have some on two sides (FIGS. 10, 11) or only on one side (FIG. 12). The height of the re-melted areas is preferably less than 80 µm from the surface of the substrate outside the pattern. The height of the re-melted areas is more preferably less than 10 µm from the surface of the substrate outside the pattern.

Figure 13:
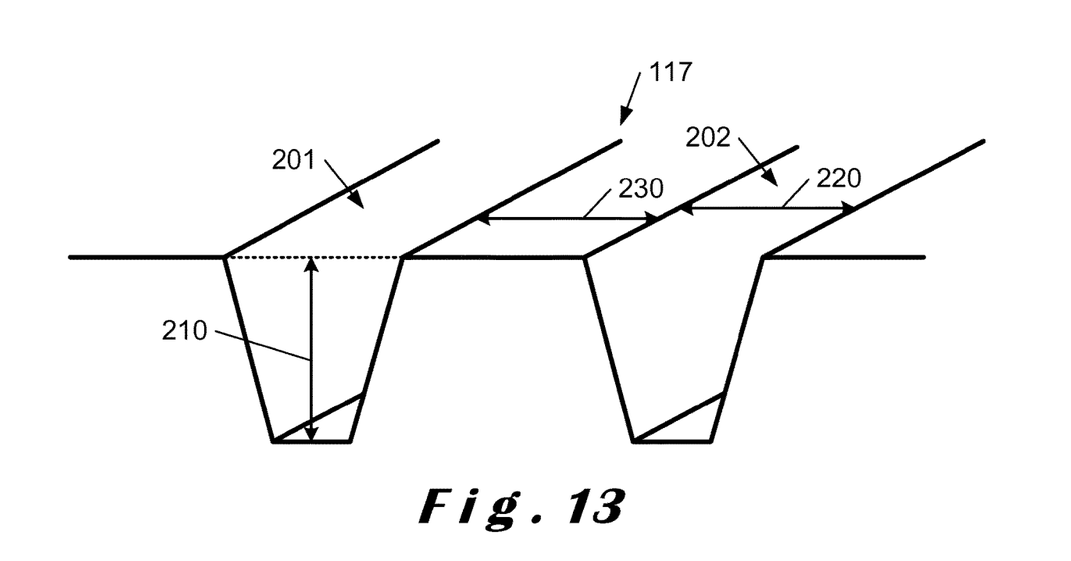
FIG. 13 illustrates a schematic section of a structured substrate during the structuring step of the method according to the invention.

FIG. 13 illustrates a schematic section of a structured substrate according to the present invention. It shows a portion of the first portion 117 of structured substrate with two grooves 201, 202. FIG. 13 shows a groove depth 210. FIG. 13 also shows a groove width 220. FIG. 13 also shows a distance 230 between two grooves.

Figure 14:
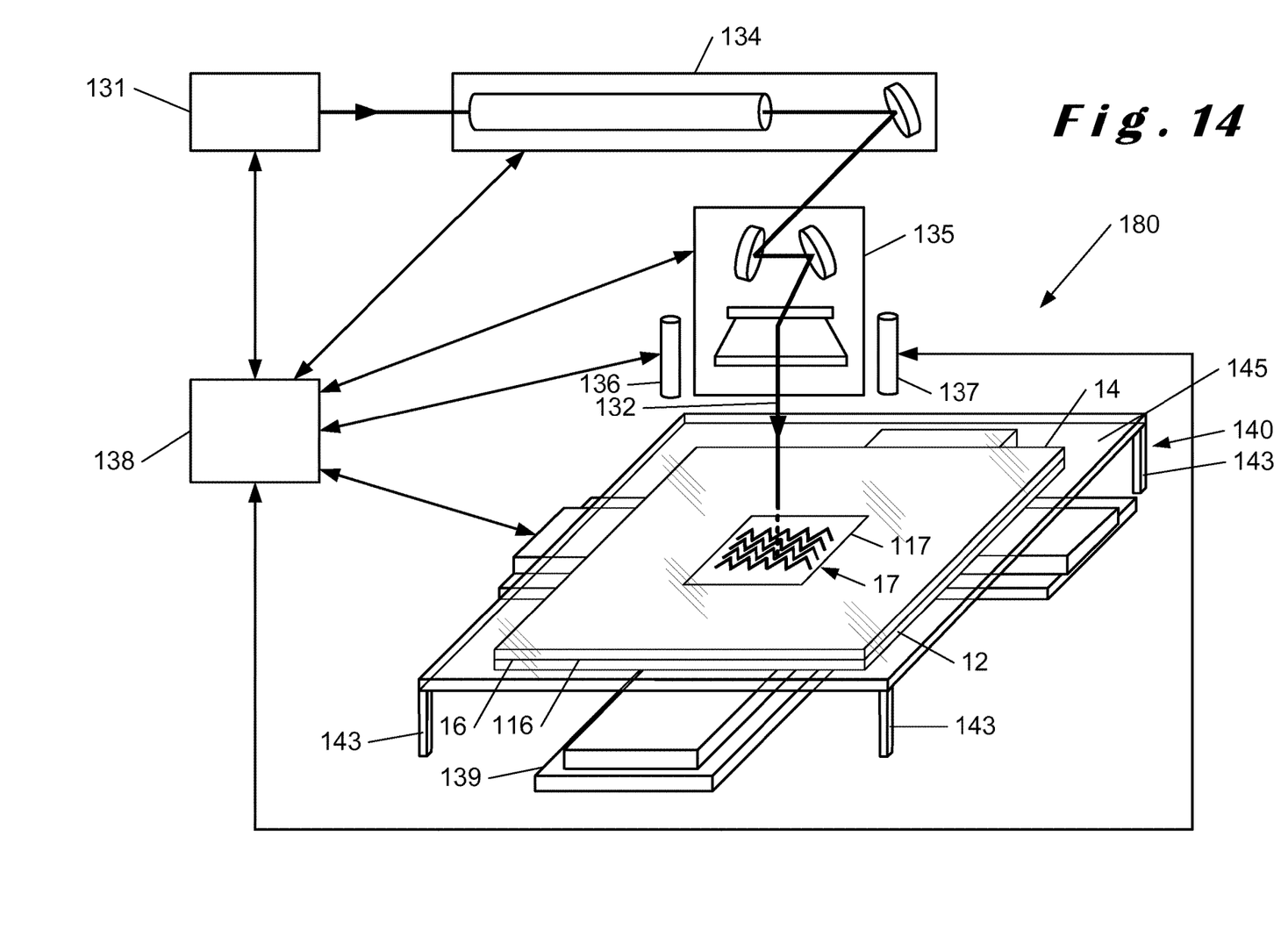
FIG. 14 illustrates an assembling device, in particular for welding the structured substrate and the part.

FIG. 14 shows an assembling device 180 for performing the welding that will carry out the assembling 130 of the substrate 12 with (texture and) pattern and the part 14. The device 180 comprises the heating device 131, which is the welding laser in the embodiment of the illustrated invention, which emits the welding beam 132 toward an optical path 134 which shapes the welding beam 132. The optical path 134 comprises different optical elements, for example at least one of: a mirror, a lens, a beam expander/collimator, an attenuator, a polarizer. The optical path 134 sends the beam 132 to a scanner head 135 which preferably comprises tilting mirrors and an ocular lens and is capable of directing the beam 132 toward the first surface portion 117 through the part 14. The device 180 also preferably comprises a vision system 136, and a temperature measuring instrument 137. The device 180 also comprises a displacement device 139 to move the set formed by the second surface portion 116 contacted with the first surface portion 117 and the pressurizing device 140 which is described in more detail with reference to FIG. 15.

In an embodiment of the invention, a computer 138, which can be a tablet, commands the welding laser, the optical path 134, the scanner head 135, the vision system 136, the measuring system 137 and the displacement device 139.

Figure 15:
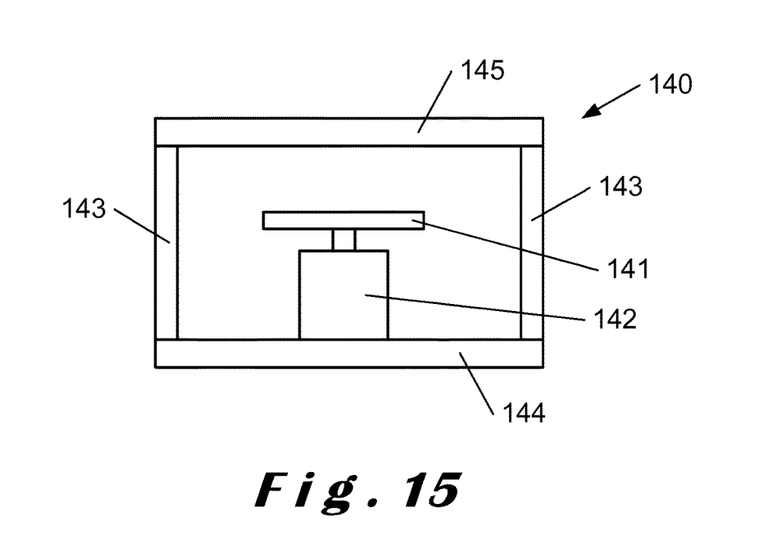
FIG. 15 illustrates a pressurizing device according to the method and the assembling and welding device according to an embodiment of the invention.

FIG. 15 shows the pressurizing device 140 comprised in the welding device 180 according to an embodiment of the invention. The pressurizing device 140 comprises a first tray 141 to support the structured substrate 12 on which the part 14 is placed. The pressurizing system 140 also comprises a height-adjustable support element 142 capable of moving the first tray 141 in a vertical direction. The pressurizing device 140 also comprises a plate 145 transparent to the welding beam 132, posts 143 supporting the plate 145 and a second plate 144 for supporting the height-adjustable support element 142 and the posts 143. The plate 145 is made of PMMA, for example. To use this device 140, the structured substrate 12 is placed on the first tray 141, the part 14 is placed on the structured substrate 12 and the height-adjustable support element 142 is adjusted to press the part 14 against the plate 145. The welding beam 132 is then sent through the plate 145. If the displacement device 139 comprises a part for moving the substrate 12 and the part 14 and located underneath them, this part may be placed under the second tray 144 or between the second tray 144 and the first tray 141, for example on or under the height-adjustable support element 142.

EXAMPLES OF EMBODIMENTS

First Example: Aluminium Substrate and Transparent Polycarbonate Thermoplastic Part A first experimental test was carried out on a 2 mm thick aluminium substrate 11 and comprised:
- the pre-treatment 50 using a pulsed laser with 50 W of power, 100 ns of pulse duration, 80 kHz of repetition rate and a linear velocity of 3,900 mm/s, and making parallel lines spaced 50 µm apart;
- the structuring 30a using a pulsed laser with 20 W of power, 100 ns of pulse duration, 20 kHz of repetition rate and a linear velocity of 720 mm/s, producing a pattern with diamonds similar to those in FIG. 7, with the largest diamonds, i.e. the outermost of the plurality of concentric diamonds, having a large diagonal of 2 mm and a small diagonal of 1 mm;
- the area occupied by said grooves and said re-melted areas 23 along said grooves on the upper surface 16 represents 0.32 of the area of said first portion 117 of upper surface 16.
- the assembling 130 of substrate 12b with a 2 mm thick transparent polycarbonate part 14; and
- a shear test which gave a result of 16 N/mm² for which a cohesive failure of the thermoplastic material was observed for this force value per surface unit.

Second Example: Galvanized Steel Substrate and Thermoplastic Polymer Part of Opaque Polypropylene Type A second experimental test was performed on a 0.8 mm thick galvanized steel substrate 11 and comprised:
- the structuring 30a using a nanosecond pulsed laser with 50 W of power, 100 ns of pulse duration, 20 kHz of repetition rate and a linear velocity of 720 mm/s, producing a pattern comprising diamonds, the diamonds being spaced 100 µm apart;
- the area occupied by said grooves and said re-melted areas 23 along said grooves on the upper surface 16 represents 0.79 of the area of said first portion 117 of upper surface 16.
- the assembling 130 of substrate 12a with an opaque 2 mm thick part 14 of PPT20 type polypropylene; and
- a tensile test which gave a result of 6.9 N/mm² corresponding to a cohesive rupture of the polymer.

Third Example: Copper Substrate and Transparent Polycarbonate Part

A third experimental test was performed on a 25 µm thick copper substrate 11 and comprised:
- the structuring 30a using a nanosecond pulsed laser with 20 W of power, 100 ns of pulse duration, 20 kHz of repetition rate and a linear velocity of 300 mm/s, producing a pattern comprising diamonds, the diamonds being spaced 80 µm apart;
- the area occupied by said grooves and said re-melted areas 23 along said grooves on the upper surface 16 represents 0.81 of the area of said first portion 117 of upper surface 16.
- the assembling 130 of the structured substrate 12 with a 2 mm thick transparent polycarbonate (PC) part 14; and
- a tensile test that gave a result of 8.43 N/mm² at the cohesive rupture of the polymer.

In other words, the invention refers to a method of assembling a substrate (11) with a part (14) comprising a structuring step of the substrate by a pulsed laser (31), the substrate (11) being preferably metallic and the part being preferably polymer-based. The structuring step allows grooves to be engraved into the substrate (11) in a pattern (17) determined by the relative motion (41) of the beam (32) and the substrate (11). The pattern (17) is designed to provide excellent adhesion between the structured substrate (12) and a part (14) after laser welding (130) of the substrate (12) and the part (14). Preferably, the method of assembling comprises a pre-treatment step (50) of the structured surface to allow better laser absorption during welding assembling.

This invention has been described in relation to specific embodiments, which are purely illustrative and should not be considered restrictive. In general, this invention is not limited to the examples illustrated and/or described above. The use of the verb "comprise", "include", "contain" or any other variant, as well as their conjugations, cannot in any way exclude the presence of elements other than those mentioned. The use of the indefinite article "a", "an", or the defined article "the", to introduce an element does not exclude the presence of a plurality of these elements. The reference numbers in the claims do not limit their scope.

The invention claimed is:

1. A method of assembling a substrate with a part, the substrate having an upper surface and a lower surface, and the part having a surface, the method comprising:
   a) structuring the upper surface of the substrate by performing the following steps:
      i) providing the substrate;
      ii) providing a pulsed structuring laser capable of generating a pulsed structuring laser beam capable of engraving the upper surface of the substrate in a non-through manner, the pulsed structuring laser beam having a wavelength of between 200 and 11,000 nm, a sufficient power to create a structuring of the substrate, and having pulses of less than 1 µs in duration;
      iii) generating the pulsed structuring laser beam; and
      iv) irradiating the upper surface of the substrate with the pulsed structuring laser beam by inducing a relative motion between the pulsed structuring laser beam and the upper surface of the substrate to generate a first portion of structured upper surface of the substrate comprising a pattern;
   b) providing the part whose surface has a second surface portion comprising a fusible material having a melting point lower than the melting point of the first portion of structured upper surface of the substrate;
   c) placing the first portion of structured upper surface of the substrate in contact with the second surface portion of the part;
   d) applying a pressure so as to maintain contact between the first portion of structured upper surface of the substrate and the second surface portion of the part; and
   e) heating the fusible material so as to reach a temperature sufficient to melt at least a portion of it in the pattern of the first portion of structured upper surface of the substrate.

2. The method of claim 1, further comprising a pre-treatment step to increase an optical absorption of a surface of the substrate and comprising the following steps:
   i) irradiating the substrate with a pre-treatment beam to increase the roughness of the upper and lower surfaces of the substrate;

ii) impose a relative displacement between the substrate and the pre-treatment beam produced by the pulsed structuring laser;

wherein the pre-treatment comprises a texturizing of the surface of the substrate which results in a shallower pre-treatment structure than the pattern engraved in step a, substep iv.

3. The method of claim 2, wherein a linear velocity of relative motion between the pre-treatment beam and the upper surface of the substrate during the pre-treatment is at least one and a half times greater than a linear velocity of relative motion between the pulsed structuring laser beam and the upper surface of the substrate during step a, substep iv.

4. The method of claim 1, further comprising the step of providing a heating device capable of creating a temperature increase in the fusible material sufficient to melt the fusible material, wherein the heating device is a welding laser producing a welding beam and which allows to heat by irradiation the structured substrate and wherein the part is at least partially transparent to the welding beam.

5. The method of claim 1, wherein the first portion of structured upper surface of the substrate is heated during step e.

6. The method of claim 1, wherein:
the pulses of the pulsed structuring laser beam have a duration of between $10^{-15}$ s and $10^{-6}$ s and a power of at least 0.01 W;
the intensity of the pulsed structuring laser beam is at least 10 W/mm$^2$;
the pulsed structuring laser beam has a wavelength of between 1,000 and 1,100 nm;
the pulsed structuring laser beam has a repetition rate of between 1 KHz and 2 MHz; and
the relative motion of the pulsed structuring laser beam with respect to the substrate is done at a linear velocity of between 10 and 10,000 mm/s.

7. The method of claim 2, wherein the pattern comprises a plurality of lines, each line corresponding to a groove engraved in the substrate, wherein the pattern comprises a geometric shapes repetition, and wherein the structured surface comprises a geometric shapes density per mm$^2$ of between 10,000 and 0.1.

8. The method of claim 1, wherein the pattern comprises a plurality of lines, each line corresponding to a groove engraved in the substrate, wherein the pattern comprises parallel lines and in that the pattern comprises a line density of between 100 lines per mm$^2$ and 0.2 lines per mm$^2$.

9. The method of claim 1, wherein the pattern comprises a plurality of lines, each line corresponding to a groove engraved in the substrate, the grooves having a width from 5 μm to 500 μm.

10. The method of claim 1, wherein the pattern comprises a plurality of lines, each line corresponding to a groove engraved in the substrate, the grooves having a depth of 1 μm to 2 mm.

11. The method of claim 1, wherein the pattern comprises a plurality of lines, each line corresponding to a groove engraved in the substrate, wherein the structured substrate further comprises re-melted areas along the grooves, the re-melted areas having a height of less than 80 μm with respect to the upper surface of the structured substrate, and wherein the area occupied by the grooves and the re-melted areas along the grooves on the upper surface represents 0.001 to 0.85 of the area of the first portion of upper surface.

12. The method of claim 11, wherein the area occupied by the grooves and the re-melted areas along the grooves on the upper surface represents 0.2 to 0.8 of the area of the first portion of upper surface.

13. The method of claim 11, wherein the area occupied by the grooves and the re-melted areas along the grooves on the upper surface represents 0.4 to 0.6 of the area of the first portion of upper surface.

14. The method of claim 7, wherein:
the substrate is made of aluminium;
the part is made of transparent polycarbonate;
the structuring laser is used for the pre-treatment step with a power of 50 W, the pulses of the pulsed structuring laser beam used for the pre-treatment step have a duration of $10^{-7}$ s, a repetition rate of 80 KHz, the relative motion of the pulsed structuring laser beam used for the pre-treatment step with respect to the substrate is done at a linear velocity of 3,900 mm/s;
the structuring laser is used for the structuring step with a power of 20 W, the pulses of the pulsed structuring laser beam used for the structuring step have a duration of $10^{-7}$ s, a repetition rate of 20 kHz, the relative motion of the pulsed structuring laser beam used for the structuring step with respect to the substrate is done at a linear velocity of 720 mm/s;
the pattern comprises a plurality of diamonds having a large diagonal of 2 mm and a small diagonal of 1 mm; and
the structured substrate further comprises re-melted areas along the grooves, the area occupied by the grooves and the re-melted areas along the grooves on the upper surface represents 0.32 of the area of the first portion of upper surface.

15. The method of claim 11, wherein:
the substrate is made of galvanized steel;
the part is made of polypropylene;
the structuring laser is used for the structuring step with a power of 50 W, the pulses of the pulsed structuring laser beam used for the structuring step have a duration of $10^{-7}$ s, a repetition rate of 20 KHz, the relative motion of the pulsed structuring laser beam used for the structuring step with respect to the substrate is done at a linear velocity of 720 mm/s;
the pattern comprises a plurality of lines, each line corresponding to a groove engraved in the substrate, wherein the pattern comprises a plurality of diamonds spaced 100 μm apart, and wherein the structured surface comprises a geometric shapes density per mm$^2$ of between 10,000 and 0.1;
the area occupied by the grooves and the re-melted areas along the grooves on the upper surface represents 0.79 of the area of the first portion of upper surface.

16. An assembly comprising a substrate and a part obtained according to the method of claim 1.

17. A device for assembling a substrate with a part, the substrate having an upper surface and a lower surface, the part having a surface that has a second surface portion comprising a fusible material having a melting point lower than the melting point of the upper surface of the substrate, the device comprising:
a pulsed structuring laser capable of generating a pulsed structuring laser beam capable of engraving the upper surface of the substrate in a non-through manner, the pulsed structuring laser beam having a wavelength of between 1,000 and 1,100 nm, a sufficient power to create a structuring of the substrate, and having pulses of less than 1 μs in duration;

a displacement means capable of generating a relative motion between the pulsed structuring laser beam and the upper surface of the substrate;
a contacting means for contacting the surface of the part with the upper surface of the substrate;
a compression means;
a heating device capable of creating a sufficient temperature increase in the fusible material to melt at least a portion of the fusible material,
wherein the structuring laser and the displacement means are configured to impose on the laser beam a relative motion between the pulsed structuring laser beam and the upper surface of the substrate to generate a pattern formed by a plurality of grooves engraved on a first portion of the upper surface of the substrate,
wherein the contacting means is configured to arrange the first portion of the upper surface of the substrate comprising the pattern in contact with the second surface portion of the part,
wherein the compression means is configured to impose a compression force between the first portion of upper surface of the substrate comprising the pattern and the second surface portion of the part,
wherein the heating device is configured to melt at least a fusible material portion of the part into the plurality of grooves of the pattern of the first portion of upper surface of the substrate, and
wherein the fusible material of the part is capable of solidifying inside the grooves of the pattern of the substrate to create a junction between the part and the substrate forming an assembly comprising the part and the substrate.

* * * * *